June 26, 1956

J. D. STRONG 2,751,816

PARABOLOIDAL REFLECTOR

Filed Sept. 12, 1951

INVENTOR.
JOHN D. STRONG

BY
Harry M. Saragovitz
Attorney

*INVENTOR.*
JOHN D. STRONG

June 26, 1956   J. D. STRONG   2,751,816
PARABOLOIDAL REFLECTOR
Filed Sept. 12, 1951   3 Sheets-Sheet 3

INVENTOR.
JOHN D. STRONG
BY Harry M. Saragovitz
Attorney

United States Patent Office 2,751,816
Patented June 26, 1956

2,751,816

PARABOLOIDAL REFLECTOR

John D. Strong, Eccleston, Md., assignor to the United States of America as represented by the Secretary of the Army Application September 12, 1951, Serial No. 246,270

1 Claim. (Cl. 88—73)

My invention relates to paraboloidal reflectors.

Reflectors in the form of a concave paraboloid are well known and are widely used in telescopes, searchlights, automobile headlights, and other optical systems. All light rays parallel to the axis which are incident upon the surface of a concave paraboloidal reflector are accurately focused at the focal point of the paraboloid. However, off-axis rays are not brought to a focus at a point but form a comet-shaped image on the focal plane. The term "off-axis rays" is used herein to mean rays parallel to each other but not parallel to the axis of the reflector. This aberration for off-axis rays increases as the angle by which they are off-axis increases. The angle at which aberration becomes intolerable determines the useful field of the reflector. In the case of a telescope, only those objects very nearly on the optical axis can be viewed satisfactorily. The aberration also increases as the distance from the vertex to the point of incidence on the reflector increases. The useful area of the reflector is limited to portions near its vertex if intolerable aberrations are to be avoided.

Reflectors can be made with curvatures other than that of a paraboloid which will improve the focus for off-axis rays. However, departure from the paraboloidal shape destroys the accuracy of focus for on-axis rays.

An object of my invention is to provide a reflector which will improve the focus of off-axis rays without impairing the focus of on-axis rays.

A further object of my invention is to provide a reflector which will permit the use of a larger aperture that can be used with a simple paraboloidal reflector.

Another object of my invention is to provide a reflector with an increased field of view.

In accordance with my invention, I provide a reflector comprising a plurality of surfaces, each of which is a paraboloid reflector. Each surface is a zone of a separate paraboloid. The focal lengths of the paraboloids corresponding to each zone are different, that for the central zone being the greatest and that for the outermost zone being the least. The zones are so arranged that the focal points of the corresponding paraboloids coincide. The focal length of the various zones are so selected that the lateral magnification of the reflector as a whole is substantially constant.

For a more complete understanding of my invention, reference may be had to the accompanying drawing in which:

Fig. 3 is a perspective view of a conventional paraboloidal reflector;

Fig. 4 represents a group of off-axis light rays which form the elements of a cylinder;

Fig. 5 is a cross sectional view of the reflector of Fig. 3 taken along the line 5—5 of Fig. 3 showing the incidence and reflection of the cylindrical ray elements $a_0$, $a_1$ and $a_5$;

Fig. 6 is a view in elevation of the reflector of Figs. 3 and 5 taken as shown by the line 6—6 of Fig. 3;

Fig. 7 is a view of the focal plane of the reflector viewed as indicated by the line 7—7 of Fig. 5;

Fig. 8 is an enlargement of the view of the focal plane shown in Fig. 7;

Fig. 9 is the same cross sectional view as Fig. 5 showing the aberration of off-axis rays incident on different zones of a single paraboloidal reflector;

Fig. 10 is an enlarged view of the focal plane of the reflector of Fig. 9;

Fig. 11 is a cross-sectional view of four confocal paraboloids showing how light rays striking approximately the same zone of each would be focused;

Fig. 12 is a cross sectional view of the four confocal paraboloids of Fig. 11 showing how light rays striking different zones of each would be focused;

Figure 3:
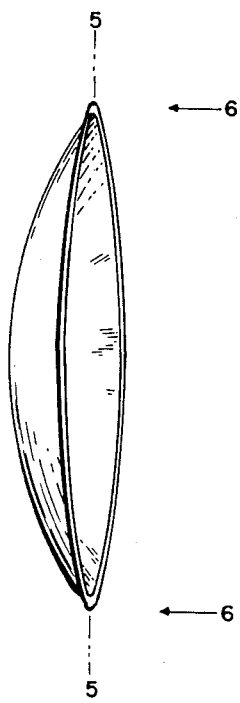
Figs. 3–14 are diagrams used to explain the invention. More particularly.
Figure 4:
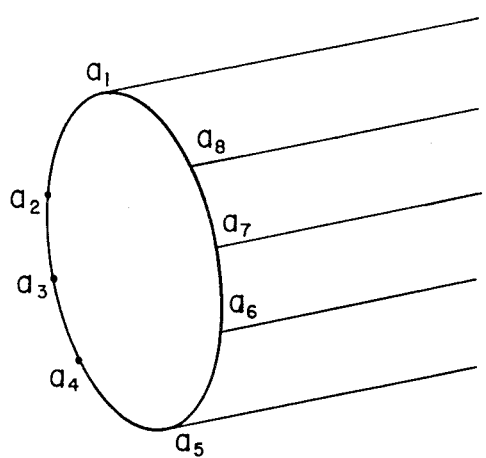
Figure 5:
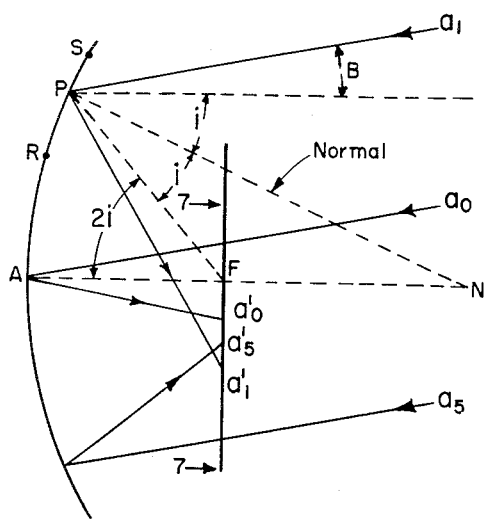
Figure 6:
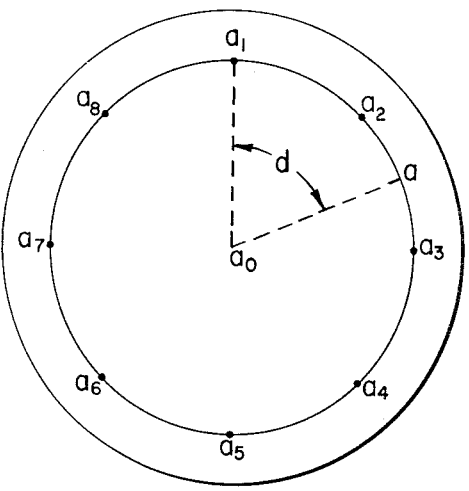
Figure 12:
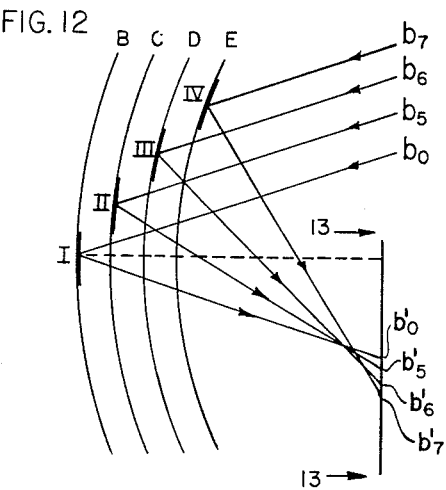
Figure 13:
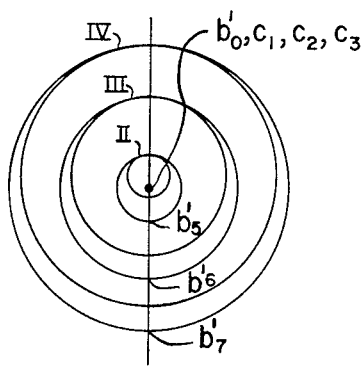
Figure 14:
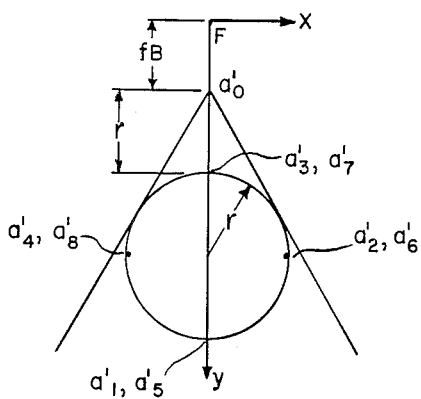

Fig. 13 is an enlarged view of the focal plane taken along the line 13—13 of Fig. 12; and Fig. 14 is a view of the focal plane of the reflector of Figs. 3, 5 and 6, showing approximately how the rays of Figs. 4, 5 and 6 would be focused for small values of angles B and $i$.

Figure 1:
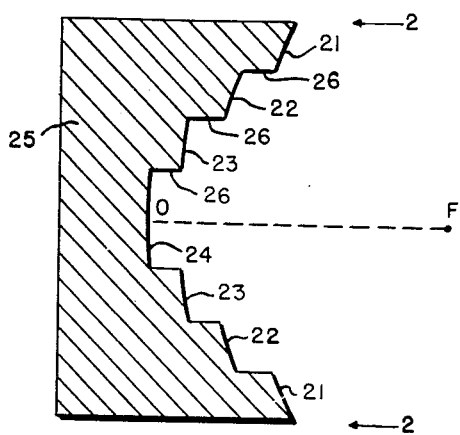
Fig. 1 is a longitudinal cross sectional view of a reflector constructed in accordance with the invention.
Figure 2:
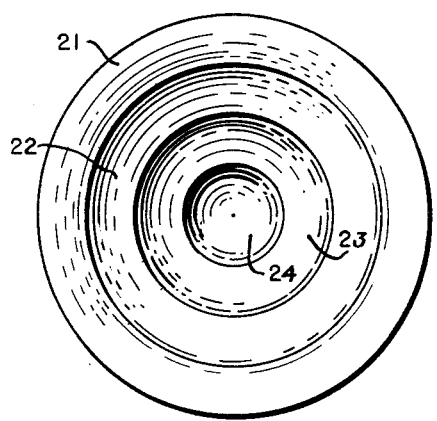
Fig. 2 is a view in elevation of the reflector taken as shown by the line 2—2 of Fig. 1.

In Figs. 1 and 2 there is shown a reflector in accordance with the invention comprising four confocal paraboloidal surfaces 21, 22, 23 and 24. The common focal point is indicated at F. Each surface is a zone of a paraboloid. The sections are mounted on a base 25 of any suitable material. The surfaces are offset from each other by shouldered portions 26. These shouldered portions are preferably made non-reflecting, by coating or otherwise. Shouldered portions 26 are preferably parallel to the optical axis OF, as shown, but this orientation is not essential. They may, for example, be oriented so that each portion 26 is a portion of a conical surface whose apex is at F. The focal length of each zone is selected so that the lateral magnification of all zones is approximately equal, as will be more fully explained.

Referring now to Fig. 3, there is shown a perspective view of a concave paraboloidal reflector. The manner in which such a reflector focuses off-axis rays will first be considered.

Referring to Figs. 4, 5 and 6, $a_1$ to $a_8$ represent parallel rays of light from a distant point. These rays are elements of a cylinder of rays (see Fig. 4) which strike a single zone of a paraboloidal reflector as shown in Fig. 6. $d$ is the facet identification angle. It identifies that facet of any particular zone which is struck by any ray, $a$. Thus for ray $a_1$, $d=0$; for ray $a_2$, $d=45°$; for ray $a_3$, $d=90°$, etc. In Figs. 5 and 6, $a_0$ represents a ray parallel to rays $a_1$ to $a_8$ which strikes the vertex of the paraboloid.

Fig. 6 shows how rays $a_0$, $a_1$ and $a_5$ are focused. These rays are in the plane of the paper and are at an angle B with the axis AN of the paraboloid. P is the point at which ray $a_1$ strikes the surface; PN is the normal to the surface at point P; F is the focus. $i$ is the angle which an on-axis ray would make with the surface at the point P. Angle $i$ can be used to identify the zone of the paraboloid, as can be more clearly seen by noting that angle $AFP=2i$ as shown. Rays $a_0$, $a_1$, and $a_5$ are focused at points $a'_0$, $a'_1$ and $a'_5$ respectively, as shown.

Figure 7:
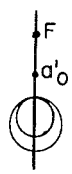

Fig. 7 is a view of the focal plane viewed as indicated by the line 7—7 in Fig. 5, and is drawn to approximately the same scale as Fig. 5. Since this scale is too small for convenience, an enlarged view is shown in Fig. 8.

Figure 8:
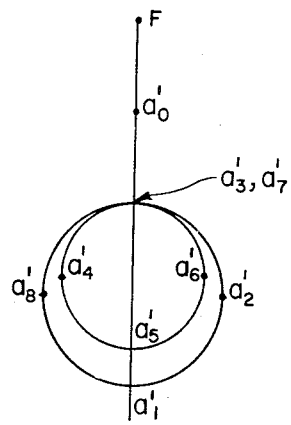

Fig. 8 shows how rays $a_0$ to $a_8$ are focused on the focal plane. Ray $a_1$ is focused at $a'_1$. As the ray moves around the zone to $a_2$ and then to $a_3$, a half circle is completed.

As the ray continues around through $a_4$, $a_5$, $a_6$, $a_7$, $a_8$ and back to $a_1$, two circles are formed.

Figure 9:
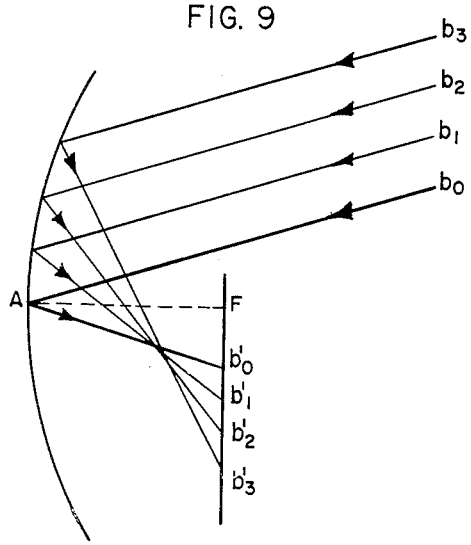

Fig. 9 shows how rays striking various zones of a paraboloidal reflector are focused. Rays $b_0$, $b_1$, $b_2$ and $b_3$ are off-axis rays, each striking a different zone. Ray $b_0$ is focused nearest to F, at point $b_0'$, as shown. Rays $b_1$, $b_2$, and $b_3$ strike the focal plane farther and farther from F, at points $b_1'$, $b_2'$, and $b_3'$ respectively.

Figure 10:
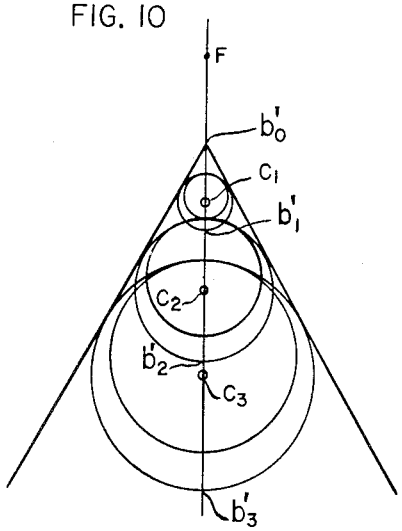

Fig. 10 shows the envelope of the comatic circles for all zones and also shows the double circles for three zones. It is seen that the distance from the focal point F to the centers $c_1$, $c_2$ and $c_3$ of the comatic circles increases as zones farther from the vertex are considered. The distance from the focus to the centroid of the image of a zone is the lateral magnification of that zone. It is obvious that if the lateral magnification could be held constant as angle $2i$ increases, the centers of all the small circles and the centers of all the large circles would coincide, resulting in improved focusing for off-axis rays.

Figure 11:
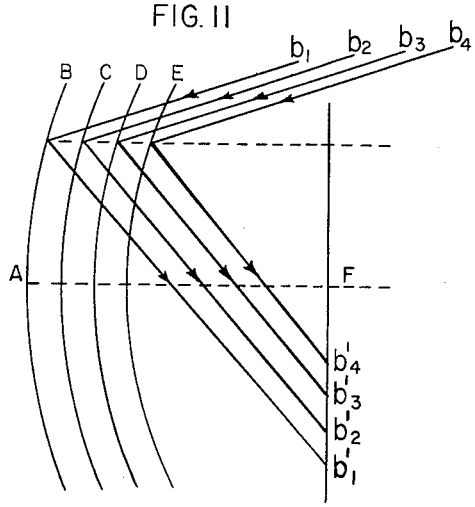

Fig. 11 shows sections of four confocal paraboloids B, C, D and E with a common focus at F. Rays $b_1$ to $b_4$ are focused at points $b'_1$ to $b'_4$ as shown. It is apparent that the lateral magnification increases with an increase in focal length.

Fig. 12 shows the same four confocal paraboloids as are shown in Fig. 11. Rays $b_0$, $b_5$, $b_6$ and $b_7$ are rays striking zone I of paraboloid B, zone II of paraboloid C, zone III of paraboloid D, and zone IV of paraboloid E, respectively. The focal lengths of the paraboloids are so selected that the lateral magnification of the above-mentioned zones are equal.

Fig. 13 is an enlarged view of the focal plane. Rays $b_0$, $b_5$, $b_6$, and $b_7$ are focused as shown. If all rays striking each of zones I to IV are considered, the rays striking each zone will be focused approximately in two circles as shown. In other words, the comatic circles are concentric, rather than as shown in Fig. 10.

The reflector of Fig. 1 is constructed by selecting zone I of paraboloid B of Fig. 12, zone II of paraboloid C, zone III of paraboloid D and zone IV of paraboloid E. The particular paraboloids and the particular zones of each may be determined experimentally. A number of paraboloids of different focal lengths are selected. A ray of light may be directed at a small angle B to a number of zones of each paraboloid successively. The location of the centroid of the comatic circles can thus be determined for each of the zones of each paraboloid. From this data, a composite reflector can be made in which the centroids of all the comatic circles will coincide.

For very small values of angles B and $2i$, a mathematical explanation can be made. For these small angles, the two comatic circles for any one zone will be approximately superimposed, as shown in Fig. 14. Fig. 14 is a view of the focal plane, similar to Fig. 8. Rays $a_0$ to $a_8$ of Fig. 6 will be focused approximately as shown in Fig. 14. Let the origin of a coordinate system be taken at F and let the $x$ and $y$ coordinates be as shown. Let $f$ be the distance from the focal point to the vertex (AF in Fig. 5). $d$ is the facet identification angle as previously explained (see Fig. 6) and $i$ is the angle of incidence of an on-axis ray at the zone identified by angle $2i$. For very small values of angles B and $2i$, the approximations $$B = \tan B \text{ and } 2i = \tan 2i$$

are warranted. Under these conditions it can be shown that the equations of the comatic circle for any zone are:

$$y = fB + 2r + r \cos 2d$$
$$x = r \sin 2d$$

where $$r = fBi^2$$

The $y$ coordinate of the centroid of the central zone for a single paraboloid will be $y = fB$. It is desired to select another paraboloid so that the $y$ coordinate of the centroid of the $i^{\text{th}}$ zone will also be $fB$. Let $f'$ be the focal length of the paraboloid to be selected. From Fig. 14, the $y$ coordinate of the centroid will be $$y = f'B + 2r$$
$$y = f'B + 2f'Bi^2$$

It is desired to make this value equal to $fB$.

$$f'B + 2f'Bi^2 = fB$$

$$f' = \frac{f}{1 + 2i^2}$$

By means of the above equation, the constants for any number of paraboloidal zones may be computed. From the data so obtained, a reflector with any desired number of zones can be constructed.

From the foregoing it is apparent that I have provided a reflector with improved focusing for off-axis rays. Although the reflector comprises zones of a plurality of paraboloids of different focal lengths, all paraboloidal zones have a common focal point. Therefore a focusing of on-axis rays is not impaired.

Although Figs. 1 and 2 show a reflector comprising four zones, it is obvious that the number of zones used is a matter of choice. In a particular application one must balance the desirability of many zones, in order to obtain the best focusing, against the expense of manufacture which increases as the number of zones is increased.

Although the invention has been explained in terms of light rays from a distant point striking the reflector, it is obvious that the reflector is equally useful for applications wherein a light source is placed at or near the focal point, as in a searchlight. It is also obvious that the reflector can be used to focus energy other than light waves, such as sound waves, heat waves, and electromagnetic waves. The reflector can be used to collect such energy emanating from a distant point or to project energy from a source placed at or near the focal point.

I claim:

In an optical object resolving system of telescopic precision including a remote source of radiation providing a beam of approximately parallel rays and off-axis rays, means to bring said rays to a focus on a common focal plane comprising; a composite paraboloidal mirror having a plurality of annular reflecting surfaces of revolution constituting zones of successively increasing diameter including a vertex zone formed on a common axis and having a common focal point, the distances from said focal point to said zones decreasing respectively as the zone diameters increase, said diameters increasing successively toward the focal plane, each reflecting zone intercepting a corresponding cylindrical portion of said off-axis rays and forming a real image of said source on said focal plane and forming also a circle of comatic aberration thereon, the spacing of said zones relative to said focal plane being such that as the zone diameters increase successively the centers of said comatic circles fall successively on a common point on the focal plane, said point being defined by the axial ray of said cylinder reflected from the vertex of the first paraboloid the diameters and spacing of said zonal reflecting elements giving the desired concentric superposition of comatic circles thereby reducing the resultant comatic aberration to a minimum conforming approximately to the relation $$f_k = \frac{f_1}{1 + 2i_k^2}$$

where $f_1$ is the focal length of the first paraboloid as measured from said common focal point to its vertex, $f_k$ is the focal length of the $k$th paraboloid as measured from said common focal point to the vertex of the $k$th zone and $i_k$ is the angle of incidence measured in radians for said off-axis rays incident at the mid-point of said $k$th zone.

(References on following page)

References Cited in the file of this patent

UNITED STATES PATENTS

| | | |
|---|---|---|
| 1,248,456 | Clark | Dec. 4, 1917 |
| 1,947,344 | Lang | Feb. 13, 1934 |
| 2,218,270 | Snook | Oct. 15, 1940 |

FOREIGN PATENTS

| | | |
|---|---|---|
| 19,900 | Great Britain | of 1908 |
| 722,326 | France | Dec. 29, 1931 |
| 919,339 | France | Nov. 25, 1946 |